Oct. 11, 1960    R. F. CHRISTY    2,955,922
GAS DETECTION APPARATUS
Filed July 22, 1957    4 Sheets-Sheet 1

INVENTOR.
ROBERT F. CHRISTY
BY
Horace B. Van Valkenburgh
ATTORNEY

FIG. 3.

Oct. 11, 1960  R. F. CHRISTY  2,955,922
GAS DETECTION APPARATUS
Filed July 22, 1957  4 Sheets-Sheet 3

FIG. 4.

INVENTOR.
ROBERT F. CHRISTY
BY
Horace B. Van Valkenburgh
ATTORNEY

Oct. 11, 1960 R. F. CHRISTY 2,955,922
GAS DETECTION APPARATUS
Filed July 22, 1957 4 Sheets-Sheet 4

INVENTOR.
ROBERT F. CHRISTY
BY
Horace B. Van Valkenburgh
ATTORNEY

United States Patent Office 2,955,922
Patented Oct. 11, 1960

2,955,922

GAS DETECTION APPARATUS

Robert F. Christy, Midland, Tex., assignor, by mesne assignments, to White Eagle International, Inc., Midland, Tex., a corporation of Delaware Filed July 22, 1957, Ser. No. 673,334

14 Claims. (Cl. 23—254)

This invention relates to gas detection apparatus, and more particularly to apparatus for detecting the presence of hydrocarbon gas, as in specimens returned from approximately successive increments of depth of a well bore during drilling of the bore by a bit while a fluid is circulated into and out of the well bore, known also as well logging.

During the drilling of a well, in an attempt to reach a producing deposit of petroleum hydrocarbons, any information which may tend to indicate the possible existence of a producing formation has a definite value. Particularly in the drilling of exploratory wells, as when geological considerations and the results of seismic or other exploration indicate the possibility or probable presence of a producing formation somewhere beneath the surface location of the well, the finding of an oil or gas producing zone is only problematical. When drilling in so-called tight formations, or when the drilling rate is quite slow, small quantities of hydrocarbon gas evolved from the drilling mud or the cuttings often have real significance in indicating the possibility of a pay zone, whereas such minute quantities may not have particular significance as such an indication when drilling at faster rates or in more porous formations.

It is modern practice to drill a well with a rotary bit which is attached to the lower end of a drill stem and rotated by machinery on the surface. It is also general practice to circulate a drilling fluid, usually termed mud, down through the drill stem and then up to the surface through the annular space between the drill stem and the wall of the bore, for several reasons, such as to cool and lubricate the bit, to remove the cuttings, or bits of rock or other material ground up by the bit, from the actual point of drilling, to provide sufficient pressure within the well to prevent a high pressure pocket of gas or other fluid from "blowing out" the well and to prevent unconsolidated formations from caving into the bore. Drilling mud is normally an aqueous suspension of a gel or other colloidal material with inert solids to add weight, although an oil emulsion mud, in which oil is emulsified in the water of the mud, or an oil base mud, may be used. Muds also may contain bentonite or other types of clay or the like to control the viscosity and other characteristics of the drilling mud, so that the mud can be readily pumped through the well and will tend to form a thick, tough layer or coating on the sides of the well to assist in preventing caveins and blow outs.

In recent years, a type of information which may be obtained during drilling and which may have considerable value to the geologists, particularly when correlated with other information available, has been derived from testing the mud for the presence of hydrocarbon gases and also testing the cuttings for hydrocarbon gases. In such testing, the mud is treated to evolve gases contained therein, either continuously or in batches, and such gases then passed, along with air, through a chamber in which is disposed a catalytic filament, such as an activated platinum filament, so that localized combustion of hydrocarbon gas is produced when the filament is heated by passing an electrical current therethrough. Such a filament may form a part of an electrical circuit, in general similar to a Wheatstone bridge, so that changes in the resistance of the filament during heating by catalytic combustion may be determined and the presence of a hydrocarbon gas thus be indicated. The cuttings may be similarly tested by removing and washing a sample thereof, immersing the sample in water in a container, agitating the contents of the container and then passing any gas which may have been released, along with air, through the chamber in which is disposed a catalytic filament connected in a circuit similar to that described above. It is also desirable, as disclosed in the Bliss and Prather U.S. Patent No. 2,514,690, to recirculate the air gas mixture from the catalytic filament chamber to the container in which the sample is being agitated, which is applicable particularly to a batch process.

It has also been found in the operation of the catalytic filament, as described, that operation of the filament at different voltages tends, if the voltages are properly selected, to cause different readings for different voltages when methane gas is present, since a pure methane and air mixture, except for extremely rich mixture, does not tend to be subject to catalytic combustion for filament temperatures below about 1170° F. Thus, in one circuit now in use, all hydrocarbon gases which contact the filament, including methane, are subject to catalytic combustion at 2.2 volts, whereas at 1.1 to 1.4 volts, methane contained in the gas does not tend to be subject to catalytic combustion, such voltage being measured across a bridge in which the detector filament and compensating filament are in series, so that the voltage across the detector filament actually is about one-half the indicated voltage. Originally, this was accomplished by shifting the voltage on the same filament between the higher and lower voltages, but more recently it has been found, as disclosed in the Robert L. Irby application, Serial No. 369,813, filed July 23, 1953, for "Method of And Apparatus For Detecting Gas Changes in Formations" (now abandoned), that much better results could be obtained when two separate filaments are operated simultaneously at the two different voltages.

It has been customary to plot the values obtained, as by readings on an ammeter placed across the Wheatstone bridge circuit in one leg of which the catalytic filament is disposed, on a log on which is also recorded the depth from which the specimen apparently came and other data, as well as the readings for the higher and lower voltages. A curve may be drawn through the points thus obtained from the higher and lower voltage readings and information of considerable value is obtained when there is a definite spread or closure between the higher and lower voltage curves, indicating a definite increase or decrease in the amount of methane present. The advantages and use of such information are described more particularly in the aforementioned Robert L. Irby application Serial No. 369,813.

While the samples of cuttings are most conveniently treated in separate batches, it is possible to divert a portion of the mud stream through a mud trap which contains an agitator, so that the diverted portion of the mud may be agitated continuously and a catalytic filament in a circuit as described above may be used in substantially continuously testing the gas evolved from the mud. By connecting such a circuit to a recorder, a substantially continuous log could be obtained on a chart, which could be driven at a constant rate and on which depth indications could be made by a device responsive to the position of the drill bit, i.e., connected to the drill stem. Since the information obtained from the cuttings may under certain circumstances have greater value or perhaps be more significant than the information obtained from the mud, the cuttings should of course be treated periodically, such as every few minutes or every foot or two during the progress of the drill stem down the bore. While the above procedures are quite satisfactory when comparatively porous formations are being drilled or when the drilling rate is relatively slow, it sometimes happens that when tight formations are being drilled or when the drilling rate is extremely slow, the quantities of gas produced by treatment of either the mud or cuttings is insufficient to cause a significant indication. Thus, it is possible to overlook an indication of the possibility of a producing formation, when drilling in tight formations or at relatively slow drilling rates.

Since the mud trap is usually some distance from the detector unit, it is desirable to move the gas, separated from the mud at the trap, as fast as possible to the detector unit to provide indications as closely corresponding to depth as possible. Also, in the event that a rather large amount of gas is liberated from the mud, the gas should be removed from the mud trap as fast as it is liberated, to prevent a build-up in the agitator, which might lead to a false indication. Since a relatively fast flow of gas through a line requires a pressure differential, a fast flow rate may be obtained by a suitable pressure or suction, but difficulty is then encountered at the detector unit, since a known volume of air should be bled into the gas, as through a bleed orifice, prior to contact with a detector filament, to dilute the gas sample by fresh air, since the gas sample might otherwise exceed the upper explosive limit of the gas-air mixture and thereby cause the filament to respond inaccurately to the combustible gas present. However, this requires a relatively low pressure, preferably nearly atmospheric, immediately preceding the detector unit, so that if an excessive pressure of gas immediately preceding the detector filament is utilized, in order to provide a fast rate of flow from the mud trap, the gas sample might be expelled through the air bleed orifice, rather than air being sucked in. Also, the drilling mud may be an oil base mud or an oil emulsion mud and in either event droplets of oil from the mud might be entrained in the gas sample. Obviously, it is desirable to remove such entrained oil droplets, since they would otherwise produce a false indication at the detector filament.

Among the objects of this invention are to provide a novel method and apparatus for detecting minute quantities of hydrocarbons in gas evolved from drilling mud, cuttings and the like; to provide such a method and apparatus which is particularly useful in connection with an electrically operated recorder, associated with a circuit which includes a catalytic filament which is contacted by gas evolved from drilling mud, cuttings and the like; to provide such a method which may be carried out readily; to provide such apparatus which can be used effectively in carrying out the method; to provide novel apparatus for increasing the rate of flow of gas to filament chambers or detector units from a mud trap; to provide novel apparatus through which accurate gas indications may be secured, even though the mud contains crude oil as a constituent; and to provide such apparatus which is readily constructed.

Additional objects, as well as the novel features of this invention, will become apparent from the description which follows, taken in connection with the accompanying drawings, in which.

In accordance with the present invention, relatively minute quantities of hydrocarbon gas may be detected, such as one part in 25,000 compared with one part in 2,500, by substituting a recorder for a meter in the Wheatstone bridge circuit of a detector filament and introducing an additional resistance across the middle of the bridge. It would be expected, of course, that an appropriate change of resistance to accommodate a recorder rather than a meter would result in the detection of the same or substantially the same proportional amount of gas. However, it has been unexpectedly found that the sensitivity of the device can be increased from up to ten-fold by introducing such additional resistance and appropriately connecting the recorder across a portion of the resistance in a voltage divider manner. For instance, when a resistance of 1200 ohms in a specific circuit was introduced, when shifting over from a meter to the recorder, when the meter had an internal resistance of 45 ohms and the recorder was connected across a 100 ohm portion of the 1200 ohm resistance, the reading of the meter and the recorder was identical. However, by connecting the recorder across the full 1200 ohm resistance, the recorder reading was ten times that of the meter. The readings were taken for the same flow of gas and were accurate to the point at which the amount of gas was so small that no deflection of the meter needle or the recorder pen could be discerned. While it might be expected that a change in the resistance across which the recorder is connected might change the recorder reading for any specific amount of hydrocarbon gas in the gas mixture, unexpectedly, minute quantities of gas were detected using the recorder, which could not be detected using a meter. There appears to be not complete explanation for this result and the exact reason is unknown, although a hypothesis relative thereto will be given later.

Also in accordance with this invention, the gas produced from the mud stream or from agitation of the cuttings, may be passed through a flow system in which a decompression chamber constructed in accordance with this invention is installed, the flow to and through the decompression chamber being controlled and the decompression chamber being operated at a relatively low pressure and preferably being elongated and open at the bottom to permit adequate control of the gas-air ratio in the mixture passing to the detector filaments and so that any droplets of oil entrained in the gas may be separated out and removed. With a decompression chamber open at the bottom, the gas pressure is reduced to atmospheric, which permits air to be sucked into the gas line leading from the chamber to a pump or the like which supplies a gas-air mixture to the detector filaments. In such a decompression chamber, the gas is also caused to follow a circuitous path, at least a portion of which is in an upward direction, so that oil droplets will tend to fall out by gravity. Thus, by utilizing such a decompression chamber, the gas from a mud or from cuttings removed from a mud which contains crude oil or emulsified oil, can be tested without the indications of hydrocarbon gas therein being rendered inaccurate by the oil in the mud.

Figure 1:
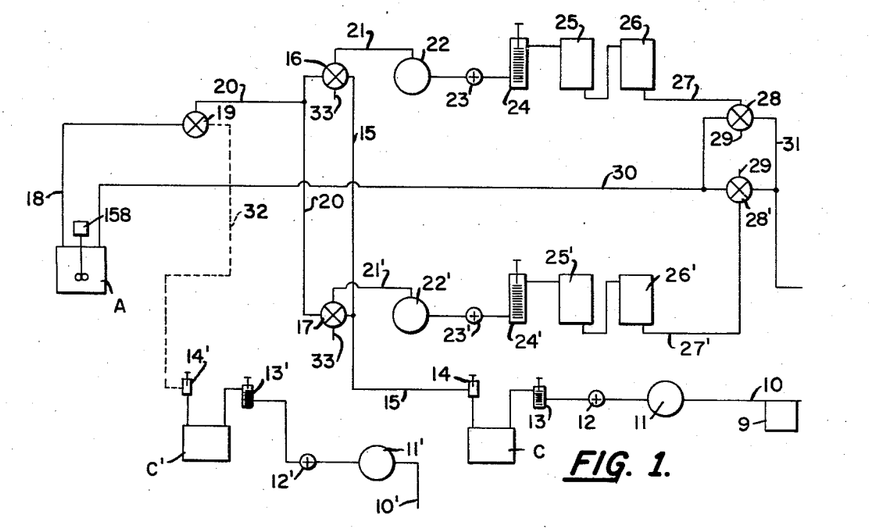
Fig. 1 is a schematic gas flow diagram, illustrating one type of apparatus constructed in accordance with this invention by which the flow of gas may be controlled and the associated parts.

The above method of this invention may be carried out in connection with, and the decompression chamber of this invention may be incorporated in, a gas flow system, such as illustrated in Fig. 1, in which an intake gas line 10 leads from a continuous agitator 9, as of conventional construction, through which a portion of the drilling mud is diverted, to cause gas contained in the mud to be separated therefrom. Line 10 leads to a pump 11, from which the gas passes to a pressure regulator 12 and thence through a flow rate indicating device 13, which indicates the volume of gas passing to a decompression chamber C, constructed in accordance with this invention and which is described later, as well as in alternative form thereof. As indicated above, when the pressure is reduced to approximately atmospheric any oil droplets are removed from the gas in the decompression chamber C, while gas sucked from the outlet thereof passes through an adjustable orifice valve 14, through which a suitable amount of air may be bled into the gas, and thence through a line 15 to one port of either of a pair of four-way valves 16 and 17, which permit the gas from the mud to be passed through either of two gas detection systems, one being usable as a standby for the other, or the one through which the gas from the mud is not passing being used to detect hydrocarbons in gas from the cuttings. To test the cuttings for hydrocarbon gases, an agitator A may be utilized, which may also be utilized to separate gas from the mud, if desired. The agitator A may be provided with a stirring device, as in the manner disclosed in the Bliss and Prather U.S. Patent No. 2,514,690, the outlet thereof being connected by a line 18 with one port of a three-way valve 19 from a second port of which the gas passes through a line 20 to a second port of either four-way valve 16 or 17. A third port of four-way valve 16 is connected to a line 21 through which the gas may flow to a pump 22, from which the gas flows through a pressure regulator 23 and a flow rate indicating device 24 to a lower voltage filament chamber 25 and thence through a higher voltage filament chamber 26, as in the manner and for the purposes described in the aforesaid application of Robert L. Irby, Serial No. 369,813. From the chamber 26, the gas may be discharged through a line 27 to one port of a four-way valve 28, a second port of which is provided with an atmospheric exhaust connection 29, through which the gas previously passed through filament chambers 25 and 26 may be exhausted to atmosphere, if desired.

The filament chambers 25 and 26 are part of what may be termed an upper bridge section, while similar filament chambers 25' and 26' are part of what may be termed a lower bridge section. Thus, a third port of valve 17 may be connected by a line 21' with a pump 22', from which the gas passes through a pressure regulator 23' and a flow rate indicating device 24' to the low temperature filament chamber 25' and high temperature filament chamber 26', in succession. From the latter, the gas may pass through a line 27' to one port of a four-way valve 28', a second port of which may be provided with an atmospheric exhaust connection 29. A third port of each valve 28 and 28' may be connected to a line 30 which leads to the agitator A, for recirculation of the gas being tested, if desired, in the manner disclosed and claimed in the Bliss and Prather U.S. Patent No. 2,-514,690. In the event that the mud samples are being treated in another agitator A, the latter may be connected to line 10, while a fourth port of four-way valves 28 and 28' may be connected to a recirculation line 31, for connection to the additional agitator. In the event that both the incoming and outgoing mud is being tested, the mud trap for the incoming or outgoing mud may be connected to line 10 and the other to a line 10' leading to a pump 11', which is connected to a pressure regulator 12', a flow rate indicating device 13', and a decompression chamber C', at which the pressure is reduced to substantially atmospheric. Gas sucked from the outlet of the decompression chamber C' passes through an adjustable orifice valve 14', through which a suitable amount of air may be bled into the gas, and thence through an alternative line 32 to three-way valve 19, which may be adjusted to connect alternative line 32 with line 20 and thence four-way valves 16 and 17. The fourth port of each valve 16 and 17 may be provided with an air intake line 33, by which atmospheric air may be sucked into either the upper or lower bridge section through operation of pump 22 or 22', respectively, to purge the respective section.

As will be evident, if the gas produced from cuttings in agitator A, for instance, is being tested by passage through the upper filament chambers 25 and 26, then four-way valve 16 will be set to connect line 20 with line 21 and three-way valve 19 set to connect line 18 to line 20, while four-way valve 28 may be set to connect line 27 with line 30, or may be set for discharge to atmosphere through connection 29. If at the same time, the gas from the mud, as through line 10, is being tested in lower filament chambers 25' and 26', then four-way valve 17 will be set to connect line 15' with line 21' and four-way valve 28' will be set for exhaust to atmosphere through connection 29. As will be evident, the gas in agitator A may be tested in the lower bridge section and the gas from incoming line 10 in the upper bridge section, if desired, merely by reversing the position of four-way valves 16, 17, 28 and 28'. Or, the incoming mud may be tested, as through line 10', in the upper bridge section by adjusting valve 19 so as to connect line 32 with line 20 and adjusting four-way valve 16 so as to connect line 20 with line 21, while at the same time the lower bridge section may be utilized in testing the outgoing mud in the manner described above. Valves 28 and 28' will then both be adjusted to discharge to atmosphere through the respective connections 29.

Through proper adjustment of regulator 12, or also regulator 12', and operation of pump 11, or also pump 11', at a suitable rate, the gas from the mud trap or traps may be moved at a relatively fast rate from the trap to the respective decompression chamber C. Also, through proper adjustment of pressure regulators 23 and 23', the gas flow through each bridge section may be readily adjusted to a value which is optimum for testing purposes. It will be noted that the decompression chambers C are open at the bottom and that therefore a pressure only slightly greater than atmospheric will exist therein; thus, the flow of gas to each decompression chamber C may be greater than the flow of gas therefrom.

Figure 2:
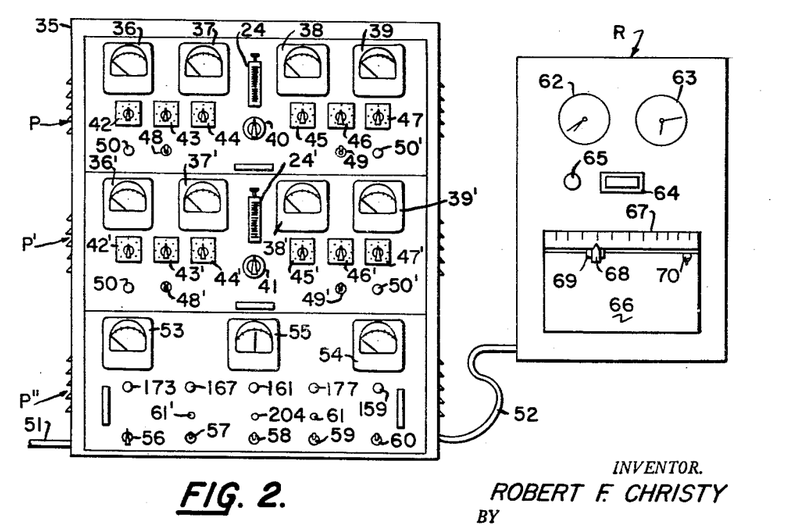
Fig. 2 is a front elevation of a recorder and a housing containing panels in which are installed other components of apparatus constructed in accordance with this invention and by which the method of this invention may be carried out.

Certain portions of the gas flow system of Fig. 1 may be installed in a separate cabinet, particularly the four-way valves 16, 17, 28 and 28', while the remainder of the gas flow system may be installed in a cabinet, such as the cabinet housing 35 of Fig. 2, in which may be installed an upper bridge panel P, a lower bridge panel P' and a power panel P''. The bridge panels P and P' may carry similar parts and equipment, such as including the flow rate indicating devices 24 and 24', respectively, as well as a volt meter 36 or 36' for the circuit which includes the low voltage filament in the chambers 25 and 25' of Fig. 1 and an ammeter 37 or 37' in the same circuit. Similarly, the respective panels P and P' may be provided with a volt meter 38 or 38' and an ammeter 39 or 39' for the respective bridge sections including the high voltage filaments in the respective chambers 26 and 26' of Fig. 1, while the panel P may also be provided with a three position selector switch 40 and the panel P' with a similar three position selector switch 41. The respective panels may also be provided with a voltage adjusting rheostat 42 or 42', respectively, a recorder calibration potentiometer 43 or 43', respectively, and a zero calibration potentiometer 44 or 44', respectively, for the respective low voltage filament circuits, as well as a voltage adjustment rheostat 45 or 45', respectively, a recorder calibration potentiometer 46 or 46', respectively, and a zero adjustment potentiometer 47 or 47', respectively, for the high voltage filament circuits. The respective panels may further be provided with an off-on bridge switch 48 or 48', respectively, and an off-on compressor switch 49 or 49', respectively, as well as bridge fuses 50 and compressor fuses 50', each placed in an accessible position.

Power panel P" may be connected by a cable 51 with a suitable source of electricity and by a cable 52 with a recorder cabinet R. The power panel may also be provided with a battery voltage meter 53, an agitator motor ammeter 54 and a dual reading battery ammeter 55, which indicates whether or not a storage battery, referred to later, is being charged or discharged. Power panel P" may also be provided with a recorder transfer switch 56 having two positions, i.e., a meter position connecting the recorder with the upper and lower bridge circuits, respectively, when shifted to opposite sides, as well as an off-on switch 57 for the charging circuit by which the above-named battery is charged, an off-on switch 58 for a depth circuit actuating unit, an off-on switch 59 for a buzzer and horn circuit, and an off-on switch 60 for the motor which drives the continuous agitator. The sample agitator will, of course, be driven by a motor at that particular piece of apparatus as indicated later. The power panel may also be provided with lights 61 and 61', for indicating respectively that the alarm circuit and the battery charging circuit are energized. The power panel may also carry certain fuses, identified later, and positioned for ready access.

The recorder R may be provided with a time clock 62 which is set at the actual time of day and a lag clock 63 which is set for the time at which the specimen being tested was at the bottom of the well. The lag time may be ascertained by placing strips of appropriate material in the mud as it starts down the well and ascertaining the time at which these strips reach the surface, then subtracting the time for the strips to go down the well, which may be calculated from the mud pumping rate and the known volume of the drill stem, based upon its length and diameter. A counter 64 may also be provided to indicate the depth of the well, counter 64 being connected in any appropriate manner with the kelly at the drill stem, as well as with a light 65 which is also connected with an alarm so that the light will turn on and the alarm will go off, as at each two feet of drilling, to warn the operator that a sample of cuttings should be tested when the lag clock reaches the same time. A chart 66 may be driven at a selected continuous rate, such as 2 in. per hour, while a scale 67 is provided with indicia of whatever units are being used in connection with the detector filaments, such as the scale 67 reading from 0 to 200. A pointer 68 indicates the scale reading of the recorder, while a print wheel 69 is conveniently adapted to mark a desired number of readings, alternately or in sequence, on chart 66. Pointer 68 and print wheel 69 are conveniently mounted on the same carriage, which is shifted in accordance with the reading obtained. A pen 70 is adapted to make a mark, as at every 2 feet of progress of the drill bit, and thus may be solenoid operated and correlated with the counter 64.

Figure 3:
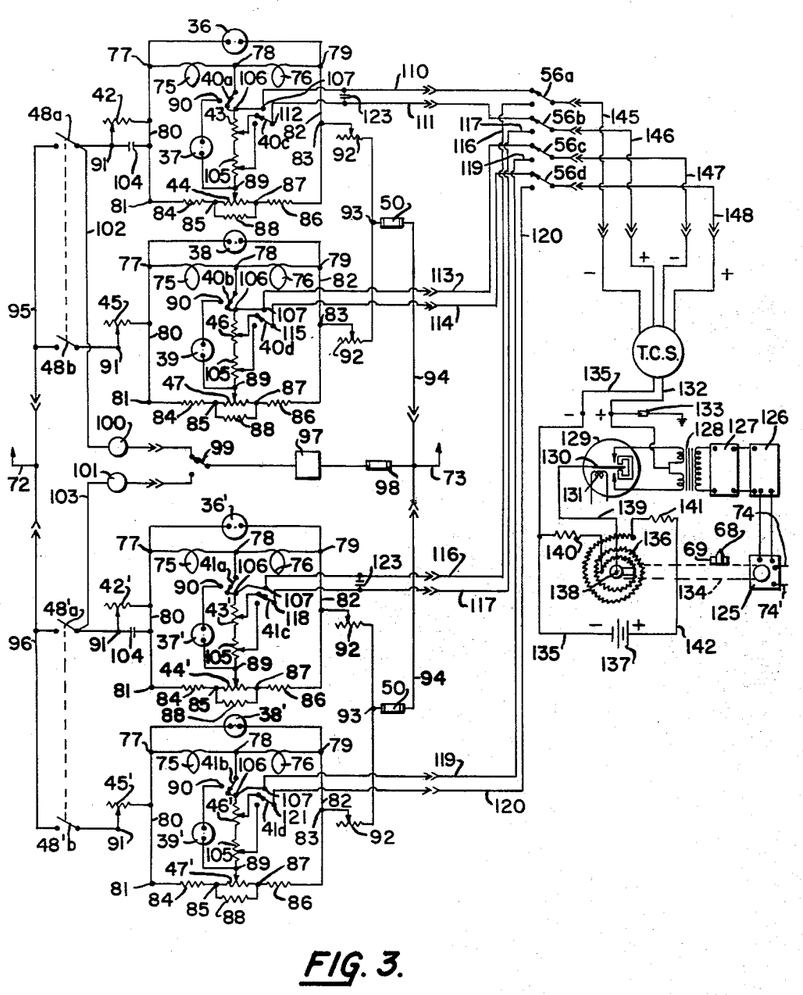
Fig. 3 is an electrical circuit diagram of the bridge and recorder sections of the apparatus of Fig. 2.

In the electrical diagram of Fig. 3, the circuits of the bridge sections mounted in panels P and P' are shown at the left and the circuit of the recorder section, mounted in the recorder R, is shown at the right, the bridge circuits and the recorder circuit being connected through the cable 52 of Fig. 2. Power is supplied to the bridge circuit through leads 72 and 73, while power to the recorder is supplied through leads 74 and 74'. The lower voltage bridge circuit and the higher voltage bridge circuit for each of the bridge sections, mounted in panels P and P', are respectively similar and the respective parts thereof are therefore identified by similar reference numerals, except where parts previously referred to are shown. Each bridge circuit includes a detector filament 75 and a compensating filament 76, the former being disposed within the respective filament chambers 25, 25', 26 and 26' of Fig. 1, and the latter being disposed in a similar filament chamber, which may be open to the atmosphere so that the difference in resistance between detector filament 75 and filament 76 occasioned by the catalytic combustion of a hydrocarbon gas or gases will cause an unbalance in the Wheatstone bridge circuit and thereby cause a reading of the respective ammeter 37, 37', 39 or 39' when the ammeter is included in the circuit, or the pointer 68 of Fig. 2. In each Wheatstone bridge circuit, a detector filament 75 is connected between terminals 77 and 78, while a compensating filament 76 is connected between terminals 78 and 79 and volt meter 36, 36', 38, or 38' may be respectively connected across terminals 77 and 79. A wire 80 may be connected from terminal 77 to a terminal 81, while a wire 82 may be connected from terminal 79 to a terminal 83. A resistance 84 may be connected between terminal 81 and a terminal 85, while a similar resistance 86 may be connected between terminal 83 and a terminal 87, the filaments 75 and 76 and the resistances 84 and 86 comprising the essential portions of the legs of the Wheatstone bridge, although for adjustment purposes, a fixed resistance 88 and potentiometer 44, 47, 44' or 47' may be connected in parallel between terminals 85 and 87, the respective potentiometers being adjusted for zero reading of the ammeter 37, 37', 39 or 39', when no hydrocarbon gas, such as merely air, is passing through the filament chamber and past detector filament 75. The respective ammeter 37, 37', 39 or 39' may be connected across the bridge, between terminal 89 of potentiometer 44, 44', 47 or 47' and a terminal 90 of a blade 40a or 40b of selector switch 40 of Fig. 2, or a blade 41a or 41b of selector switch 41 of Fig. 2, each of which is connected to the respective terminal 78. The respective rheostat 42, 42', 45 and 45' may be connected between wire 80 and a terminal 91, to control the voltage applied to the bridge. An adjustable resistance 92 may be connected between terminal 83 and a terminal 93, on the opposite side of each bridge, and may be set to limit the maximum voltage applied to the bridge through the respective rheostat 42, 45, 42' or 45'. The adjustable resistances 92 of the respective upper and lower bridge sections may be connected through terminal 93 and fuse 50 to lead wire 73 by means of a wire 94. A wire 95 connects lead 72 to blades 48a and 48b of bridge switch 48 and a wire 96 to blades 48'a and 48'b of bridge switch 48', each of Fig. 2, in turn connected to the respective terminal 91, so that when switch blades 48a and 48b or 48'a and 48'b are closed, the Wheatstone bridge circuit for the respective detector filaments 75 will be energized. Wires 94, 95 and 96 may be provided with plug and jack connections, as indicated, for convenience in installation and repair.

Since the lower voltage detector filaments may become occluded or clouded, as with an accumulation of sulfur deposit from $H_2S$, the lower voltage filaments are preferably periodically subjected to a higher voltage, such as 3.0 volts. For this purpose, a burnoff timer 97 may be connected through a fuse 98 to lead 73 and to a blade 99 of bridge selector switch 56 for automatic successive connection to a relay coil 100 or 101, and a wire 102 or 103 with the respective terminals of switch blades 48a and 48'a; so that when relay coil 100 or 101 is energized, the respective burnout relay contacts 104, connected between wire 80 and terminal 91 for each of the lower voltage circuits will be closed to short across the respective potentiometer 42 or 42', thereby applying the higher voltage to the detector filament for a predetermined period of time, such as 45 seconds, as at intervals of 30 minutes.

In accordance with this invention, for connection to a recorder, the respective potentiometer 43, 46, 43', 46' and an adjustable resistance 105 (not shown in Fig. 2)

may be connected in series between terminal 89 and a contact 106 of switch blade 40a, 40b, 41a or 41b, respectively, it being noted that contact 106 may be connected to the adjacent contact and to contact 107 of switch blade 40c, 40d, 41c and 41d, respectively, so that blade 40a, 40b, 41a and 41b may be synchonized with blade 40c, 40d 41c and 41d respectively. Thus in one position of switch blade 40c, 40d, 41c and 41d, respectively, the recorder may be connected across a portion of the resistance of potentiometer 43, 46, 43' or 46', and in another position across the resistance of the respective potentiometer and also a portion of resistance 105, the latter producing the greatest sensitivity. Recorder connection wires 110 and 111 may lead from the low voltage filament circuit of the upper bridge section to the recorder, respectively from contacts 106, 107, which are connected together, and the principal terminal 112 of blade 40c. As will be evident, with blades 40a and 40c in the position shown, the recorder will be so connected and the meter 37 will be out of the circuit. If switch 40 is moved so that blade 40a will engage contact 106, blade 40c will be simultaneously moved to the contact which connects one side of the recorder to the adjustable arm of resistance 105, as when the recorder readings become sufficiently high to go off scale and off the chart. Wires 113 and 114 may similarly lead to the recorder from contact 106, 107 and terminal 115 of blade 40d, respectively, of the higher voltage filament circuit of the upper bridge section, it being noted that blades 40c and 40d are moved to positions corresponding to blades 40a and 40b whenever switch 40 of Fig. 2 is turned. Similarly, wires 116 and 117 may lead to the recorder from the low voltage filament section of the lower bridge section, i.e., from contacts 106, 107 and terminal 118 of blade 41c, while wires 119 and 120 may lead to the recorder from the high voltage filament circuit of the lower bridge section, i.e., from contacts 106, 107 and terminal 121 of blade 41d, it being noted that blades 41a, 41b, 41c and 41d will be shifted simultaneously to corresponding positions when switch 41 of Fig. 2 is moved. Wires 110 and 111, 113 and 114, 116 and 117, and 119 and 120, lead respectively to contacts of blades 56a, 56b, 56c and 56d of bridge selector switch 56 of Fig. 2, so that with contacts 56a to 56d in the position shown in Fig. 3, the upper bridge section will be connected to the recorder through wires 110, 111 and 113, 114. However, if switch 56 is shifted to its opposite position, blades 56a to 56d will engage the contacts shown as open, so that the lower bridge section will be connected to the recorder, through wires 116, 117 and 119, 120.

If switch 40 of Fig. 2 is moved so that blades 40a and 40b engage contact 90, to place meters 37 and 39 in the circuit, blade 40c will short across wires 110 and 111 and blade 40d will similarly short across wires 113 and 114, to prevent an open circuit into the recorder, which might cause the recorder to drift off scale and set off the gas alarm, which normally indicates that the recorder is going off scale. Similarly, when switch 41 of Fig. 2 is moved so that blades 41a and 41b engage contact 90, to place meters 37' and 39' in the respective filament circuit, blades 41c and 41d will short across wires 116, 117 and 119, 120, respectively. When the burnout timer 97 operates to close relays 100 or 101, to apply a higher voltage to the low voltage detector filaments, auxiliary relay contacts 123, also operated by burnout timer relay 100 or 101, close to short across wires 110 and 111, or 116 and 117 for a similar purpose.

In the recorder R, A.C. leads 74 and 74' may supply a two phase balancing motor 125, a power amplifier 126, a voltage amplifier 127, and the coil for a vibrator 130 of a converter 129. One of leads 74 and 74' is connected to a condenser at motor 125 to cause one phase winding of the motor to be shifted 90° from the A.C. supplied to a coil 131 for vibrator 130. Vibrator 130 supplies a chopped signal to transformer 128, the center tap on the secondary of the transformer being connected to a positive lead 132 to which direct current is supplied from the bridge and which may also be connected to a grounded condenser 133. Balancing motor 125 is responsive to the direction of current flow through the vibrator and transformer 128 and moves a belt 134, shown in dotted lines for clarity of illustration, until the voltage drop across positive lead 132 and a negative lead 135, also connected to the bridge, is equal to the voltage drop across a slide wire 136 from a battery 137, the slide wire 136 conveniently being helical, as shown. Belt 134 turns a rotatable contact 138, which engages slide wire 136 to change the resistance thereof until a balance is secured, while belt 134 may also move the pointer 68 and print wheel 69. Rotatable contact 138 may be connected by a wire 139 with vibrator 130, while calibration resistances 140 and 141 may be connected between the respective ends of slide wire 136 and the respective terminals of battery 137, to the negative terminal of which negative lead 135 may also be connected, as by resistance 140 being connected between one end of slide wire 136 and negative lead 135 and resistance 141 being connected to the opposite end of slide wire 136 and by a wire 142 with the positive terminal of battery 137.

A time controlled selector switch, indicated as T.C.S., periodically connects the desired detector filament circuit with leads 132 and 135, as through wires 145 and 146, leading from switch blades 55a and 55b, respectively, or wires 147 and 148, leading from switch blades 55c and 55d, respectively. As will be evident, whenever wires 145 and 146, or wires 147 and 148, are connected through the time selector switch to the leads 135 and 132, respectively, the voltage drop across leads 135 and 132 will be increased or decreased in accordance with the voltage drop across that portion of the potentiometer 43, 46, 43' or 46' and resistances 105 in the filament circuit, across which the recorder is shunted, so that the balancing motor 125 will then move belt 134 until the battery voltage drop is balanced, as described above. Thus, the belt 134 will move the pointer 68 and print wheel 69 to a position corresponding to the gas reading indicated by the respective filament circuit. Since the electrical power required to turn the balancing motor 125 is derived from the leads 74 and 74', rather than from any voltage drop produced in the gas detector circuit, it is possible that this results in a greater sensitivity and also the ability of the circuit, when including the recorder, to detect minute quantities of gas which might go undetected with the meter 37 and 39, or 37' and 39', in the respective detector filament circuits. Print wheel 69 of the recorder may be automatically rotated so as to print two or any multiple of two numbers, as by conventional association with the time controlled selector switch T.C.S., so that consecutive numbers will be printed in sequence on the chart 66 of Fig. 2, such as the odd numbers for the low voltage filament bridge and the even numbers for the high voltage filament bridge. It will be understood that whenever one of the bridge circuits is connected through the time controlled selector switch, the print wheel 69 should automatically be moved to a position corresponding thereto. Also, by suitable variation of switch 56 and a corresponding increase in the number of wires corresponding to wires 145, 146 and 147, 148, both the upper and lower bridge sections may be connected to the recorder so that the gas indication readings of both bridges will be placed on the recorder chart, such as when both the incoming and outgoing mud is being tested. Of course, when both the incoming and outgoing mud is being tested, the gas evolved from the cuttings, as in agitator A of Fig. 1, may be tested in a separate but similar bridge circuit, or the bridge circuit for the gas from the cuttings may be connected to the recorder. In the latter event, during periods when the cuttings are not being tested, the number or numbers imprinted on the chart by the print wheel 69 and corresponding to the cuttings test will, of course, read zero, but when the cuttings are being tested, the number or numbers corresponding thereto on the print wheel will be placed on the chart at positions corresponding to the gas readings obtained.

The various resistances may have suitable values, although these may be changed in accordance with conditions. For instance, resistances 84 and 86 may be 10 ohms each, resistance 88 may be 5 ohms, resistance 92 may be 3 ohms, the resistance of potentiometers 42, 45, 42' and 45' may be 6 ohms each, the resistance of potentiometers 44, 47, 44' and 47' may be 3 ohms each, the resistance of potentiometers 43, 46, 43' and 46' may be 200 ohms each and resistance 105 may be 1,000 ohms. In general, the potentiometers 43, 46, 43' and 46' and the adjustable arm of the resistance 105 may each be set at approximately the midpoint of the resistance wire, although other positions may be found suitable or desirable. The internal resistance of meters 36, 38, 36' and 38' may be 300 ohms each, while the internal resistance of meters 37, 39, 37' and 39' may be 45 ohms each. It will be noted that, even though the resistance of meter 37, 39, 37' or 39' is only 45 ohms, when a total resistance of 1,200 ohms, from the respective potentiometer 43, 46, 43' or 46' and resistance 105, is placed in the circuit when the recorder rather than the meter is connected in the circuit, the readings which can be obtained, particularly for low gas values, are much more sensitive with the recorder than with the meter. For instance, with the meter 37, 39, 37' or 39' in the circuit, approximately one part in 2,500 of hydrocarbon gas in the air gas mixture can be detected by a meter indication.

However, with the switch blade 40c in the position shown in Fig. 3, for instance, and the recorder connected in the circuit, one part of hydrocarbon gas to 5,000 parts of the air-gas mixture will produce a discernible reading or indication. Furthermore, with blade 40c turned to the other recorder contact, so that terminal 112 is connected to the potentiometer 43, 46, 43' or 46', one part of hydrocarbon gas to 25,000 parts of the air-gas mixture will produce a discernible indication. Apparently, the greater the resistance across which the recorder is shunted, the greater is the sensitivity. The ability to detect minute quantities of hydrocarbon gas is of particular importance when a relatively tight formation is encountered or in the case of formations in which the drilling rate is relatively fast, as indicated previously.

Figure 4:
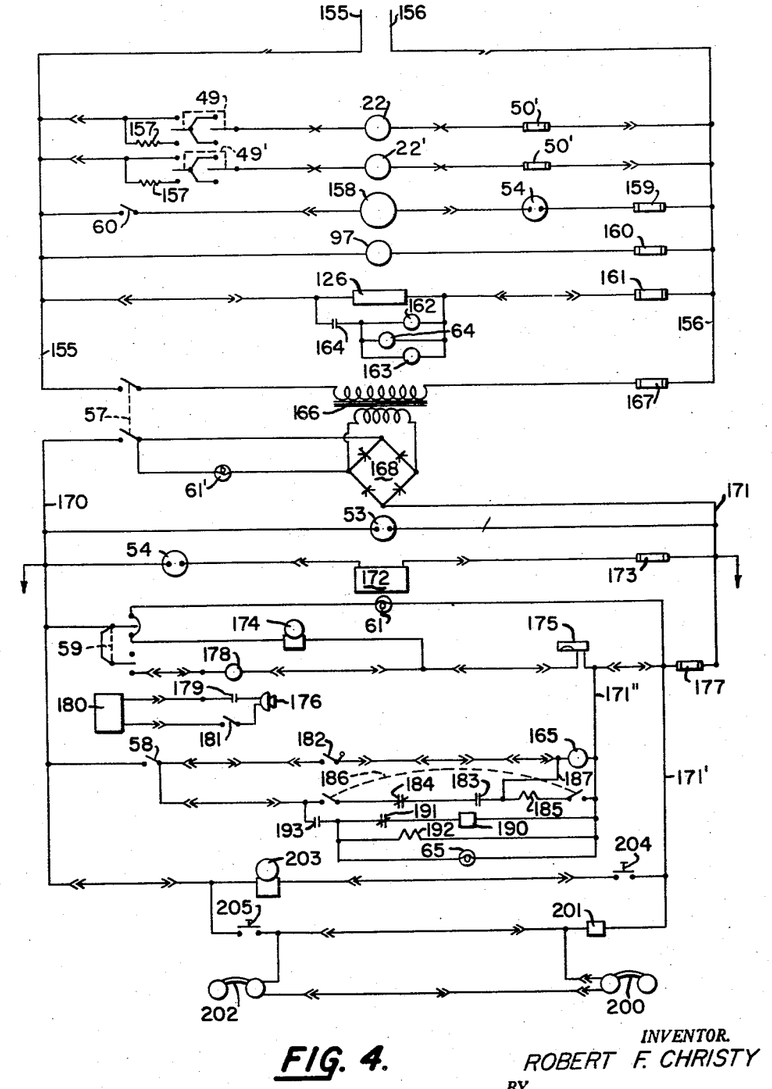
Fig. 4 is an electrical circuit diagram of the power and signal section of the apparatus of Fig. 2.

In the power and signal section, illustrated in Fig. 4, leads 155 and 156 may supply electricity at a suitable voltage, such as 110 volts A.C., while a number of the parts may be connected across the leads 155 and 156, certain of these parts also being shown in Figs. 1 and 2. Thus, the upper bridge compressor 22 and lower bridge compressor 22' may be respectively connected in series with switches 49 and 49', respectively, and the respective fuse 50', each of switches 49 and 49' conveniently having one off position and two on positions, one of which is adapted to cause the compressor to operate at a lower rate, as by the interposition of a resistance 157 in the motor circuit. Similarly, a motor 158 for agitator A may be connected in series with switch 60, meter 54 and a fuse 159, while the motor for burnoff timer 97 may be connected in series with a fuse 160. Similarly, the recorder amplifier 126 may be connected in series with a fuse 161, while a shunt connection therewith may include depth register 64, a depth pen solenoid 162 and a stepping relay 163, the latter three being connected in parallel and all in series with depth relay contacts 164, closed by relay 165 which is referred to later. One winding of a transformer 166 may be connected in series with a fuse 167 and the flow of current therethrough controlled by switch 57, which may be a double pole switch also controlling a rectifier 168 connected to the secondary winding of transformer 166 and also connected across auxiliary leads 170 and 171, with the charging circuit light 61' associated with the rectifier in a conventional manner. Battery voltage meter 53 may be connected across auxiliary leads 170 and 171, while a storage battery 172 may also be connected across the auxiliary leads, in series with ammeter 54 and a fuse 173. An alarm bell 174 may be connected in series with one pole of switch 59 and an alarm bell switch 175, located at the recorder, with light 61 being connected in parallel with the alarm bell and switch 59 preferably having an off position and two on positions, with the alarm bell 174 and light 61 being in the circuit for one on position and both the alarm bell and a horn relay 178 as well as light 61 being in the circuit for the other on position of switch 59. An alarm fuse 177 may be connected between auxiliary lead 171 and a further auxiliary lead 171', while horn 176 may be controlled by a relay coil 178, connected to the other pole of switch 59 and adapted to close contacts 179 when the horn is to be energized by a battery 180. A toggle switch 181 may also be in series with the horn, so that a horn may be turned off after it has performed its function and until the condition causing the horn to sound has been corrected, i.e., the recorder going off scale. Also connected between auxiliary leads 170 and 171', as by an additional auxiliary lead 171'', are the depth pen switch 58, in series with a depth impulse microswitch 182 and depth relay 165, adapted to close contacts 183, which are placed in series with the normally closed contacts 184 and the coil 185, of a thermostatic relay, the parts 183 and 184 and 185 being connected in series with a switch 186, which is a manually controlled toggle switch, the local circuit of which may be connected to relay 165 by a shunt wire 187. Switch 186 can be used to deactivate this portion of the depth circuit when drilling in hard formations at a slow rate, i.e., as an "anti-bounce" switch. When the drilling in hard formations is at a slow rate, the bit may tend to bounce up and down, thus producing an impulse to activate the depth switch at each bounce, rather than at each two feet of depth. However, when switch 186 is closed, the thermostatic relay 185 will maintain relay coil 165 energized, even though switch 182 opens and closes several times.

Shunted around a portion of the circuit, including the switch 186, is a buzzer 190 in series with a set of normally closed contacts 191 adapted to be opened by a thermostatic relay 192 which, with timer light 65, are in parallel with buzzer 190. The latter and associated parts are in series with normally open contacts 193, controlled by the stepping relay 163. This allows a 2 ft. signal, although depth impulses originate every foot to operate the counter.

The auxiliary leads 170 and 171' conveniently supply power for a telephone circuit to provide communication between the operator of the gas detector unit, who will normally be located in a trailer in which the gas detection apparatus is installed, and the driller, who will be on the floor of the drilling rig. The telephone circuit may include a telephone 200 and a buzzer 201 in the trailer and a telephone 202 and a bell 203 on the drill rig floor, with a push button switch 204 installed in a convenient location, as in the power panel of Fig. 2, for calling the driller, as well as a push button switch 205, installed on the rig floor, so that the driller may actuate buzzer 201 when he desires to speak to the gas detection equipment operator. The various wires shown may be provided with plugs and jacks, as indicated, for convenience of installation.

Figures 5, 6, 7:
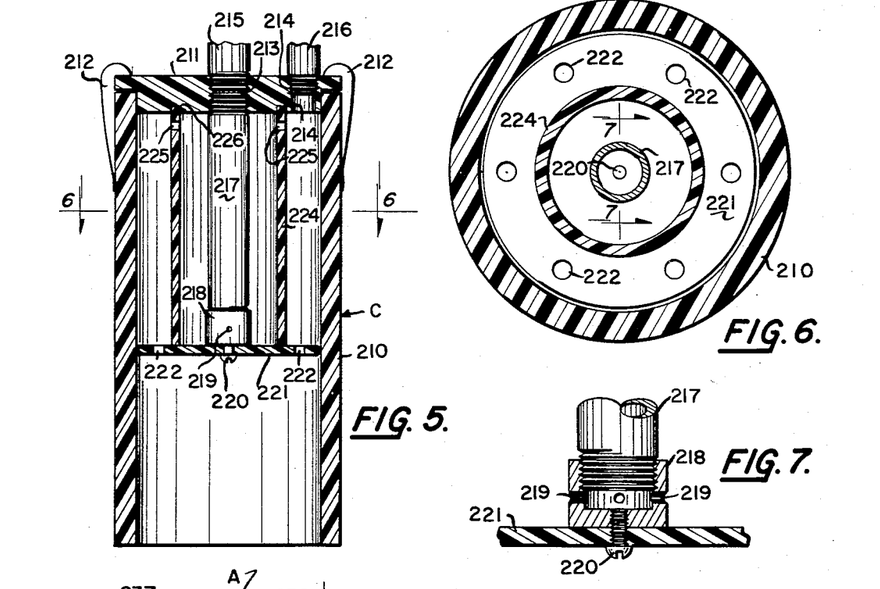
Fig. 5 is a vertical section of a decompression chamber forming a part of the apparatus of Fig. 1.
Fig. 6 is an enlarged cross section taken along line 6—6 of Fig. 5.
Fig. 7 is a fragmentary vertical section taken along line 7—7 of Fig. 6.

Decompression chamber C or C' of Fig. 1 may be constructed in the manner illustrated in Figs. 5–7, thereby including a relatively elongated, upright cylinder 210, the lower end of which is open, but the upper end of which may be closed by a flanged top 211 removably held in position by clips 212. Top 211 may be provided with a central hole 213, conveniently tapped from both sides and a radially spaced hole 214, which may be tapped from the upper side only. An inlet pipe 215 may extend upwardly from central hole 213 and an outlet pipe 216 may similarly extend upwardly from spaced hole 214, while a centrally disposed nipple 217 may extend downwardly from central hole 213. At its lower end, nipple 217 may be provided with a cap 218 having a series of holes 219 in the side wall thereof, disposed below the lower end of nipple 217, for discharging the incoming gas outwardly into the space around the nipple. The cap 218 may also be provided with a tapped hole adapted to receive a screw 220 by which a flat, circular baffle 221 is suspended from the cap and nipple. The outer edge of baffle 221 may be spaced slightly from the inner wall of cylinder 210, while baffle 221 may also be provided with a series of holes 222 disposed, as in Fig. 6, outside of a cylindrical baffle 224 having a series of holes 225 adjacent its upper end. Top 211 may also be provided with an annular groove 226 which receives the upper end of cylindrical baffle 224 to maintain it centered, baffle 224 being held in the groove by the lower baffle 221. Cylinder 210, top 211 and baffles 221 and 224 may be formed of suitable material, such as plastic, while nipple 217 and cap 218 may be formed of brass or other suitable material.

As will be evident, incoming gas from the inlet pipe 215 moves downwardly through nipple 217 at the delivery pressure of flow rate device 13 of Fig. 1, and then outwardly through the holes 219 in cap 218, thence upwardly at a reduced pressure between the nipple and cylindrical baffle 224, thence outwardly through holes 225 and downwardly between cylindrical baffle 224 and cylinder 210 at near atmospheric pressure. Since the pressure in the chamber outlet is only slightly above atmospheric, a portion of the gas will be discharged through and around the flat baffle 221, while the remaining gas will be available at the outlet pipe 216, the proportion of the gas passing through the lower end of cylinder C in comparison with that passing through the outlet 216 being primarily dependent upon the suction effect produced at the outlet 216, as by the pump 22 or 22' of Fig. 1. Thus, no air will mix with the gas, adjacent outlet 214, but the pressure will be sufficiently low that a controlled amount of air may be aspirated into the gas in the suction line of the pump.

As will also be evident, the path of the gas through the decompression chamber will be circuitous, so that any droplets of oil suspended in the gas will separate out and will be discharged through and around flat baffle 221.

Figure 8:
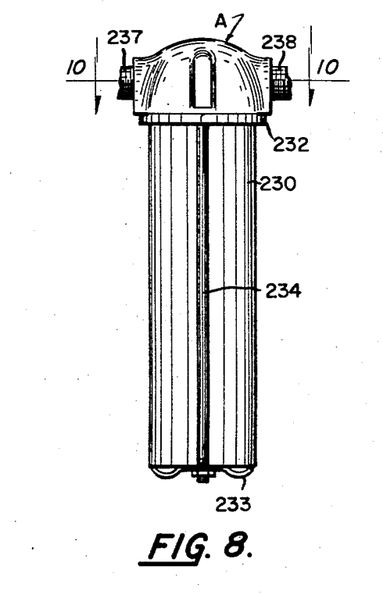
Fig. 8 is a vertical section of an alternative form of decompression chamber.
Figure 9:
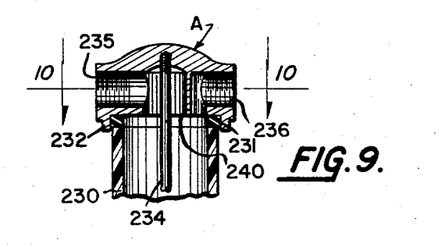
Fig. 9 is a fragmentary, vertical section through the upper portion of the chamber of Fig. 8.
Figure 10:
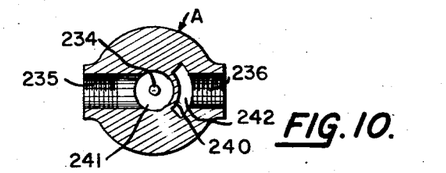
Fig. 10 is a cross section, taken along line 10—10 of Figs. 8 and 9.

The alternative decompression chamber of Figs. 8 to 10, inclusive, may include a cylinder 230 having an open lower end and a top closed by a cap A, cylinder 230 conveniently being made of transparent material, such as plastic, while the cap A may be formed of metal, as by die casting. The upper end of cylinder 230 may abut against a gasket 231, formed of a material unaffected by petroleum products and fitting within an annular rim 232 of cap A. The cylinder 230 may be clamped in position by a clip 233 engaging the lower end of the cylinder and attached to the lower end of a stud 234, the upper end of which may be threaded into the cap. Cap A may be provided with a threaded inlet 235 and a threaded outlet 236, into which nipples 237 and 238 may be respectively threaded, for attachment of the incoming and outgoing gas lines. Cap A may also be provided with a baffle 240 which extends downwardly and against which the incoming gas impinges, baffle 240 conveniently separating an inlet chamber 241, through which stud 234 extends, from an outlet chamber 242, the chambers connecting with the inlet and outlet, respectively. As will be evident, since the cylinder 230 is open at the bottom, the pressure within the chamber will be reduced to substantially atmospheric, so that any excess pressure, caused by the operation of pump 11 or 11' of Fig. 1 to draw gas at a relatively fast rate from the mud trap, will be dissipated. Thus, the suction of pump 22 or 22' of Fig. 1 will pull gas from the decompression chamber through the outlet 236, so that a controlled amount of air may be bled into the gas through the orifice valve 14 or 14' of Fig. 1. As will further be evident, when the incoming gas strikes the baffle 240 it will be deflected downwardly and thereby be forced to travel a circuitous path which, in combination with the reduction in pressure, will cause any droplets of oil entrained in the gas to fall out through the open lower end of the cylinder 230.

Although preferred embodiments of this invention have been illustrated and described and certain alternative embodiments, particularly of the decompression chamber, have been illustrated and described, it will be understood that other embodiments may exist and that various changes may be made, all without departing from the spirit and scope of this invention.

What is claimed is:

1. In apparatus for detecting the presence of combustible gas in specimens returned from apparently successive increments of depths of a well bore, during drilling of said bore by a bit while a fluid is circulated into and out of the well bore, including means for treating a series of possible gas containing specimens to cause gas to evolve therefrom, a catalytic filament contacting said gas to indicate the presence of combustible gas therein, means for causing said gas to contact said filament, an electrical Wheatstone bridge circuit including said filament and normally including an electrical meter connected across said circuit for indicating an effect produced at said filament by catalytic combustion; the improvement comprising an electrically operated recorder for making a record at least periodically of said effect; a resistance connected across said circuit in the position normally occupied by said meter, said resistance having a value greater than the internal resistance of said meter; and means for connecting said recorder across a portion of said resistance.

2. In apparatus as defined in claim 1, including means for substituting said meter for said recorder and said resistance in said Wheatstone bridge circuit.

3. In apparatus as defined in claim 1, including an electrical power supply for said recorder; said recorder having movable indicating means and means responsive to the voltage drop across the recorder connection at said resistance, for moving said indicator to a position corresponding to said voltage drop, said responsive means being supplied with electricity for moving said indicating means by said recorder power supply.

4. In apparatus as defined in claim 1, including a chamber separate from said treating means and having a bottom open to the atmosphere and means for causing gas to follow a circuitous path in said chamber; means for supplying said evolved gas to said chamber, whereby the pressure in said chamber will be reduced to approximately atmospheric; and means connected to the upper portion of said chamber for removing gas therefrom and mixing air therewith to provide an air gas mixture to be supplied to said catalytic filament.

5. In apparatus for detecting the presence of combustible gas in specimens returned from apparently successive increments of depths of a well bore during drilling of said bore by a bit while a fluid is circulated into and out of the well bore, said mud carrying cuttings from said well bore, including means for treating a series of specimens of cuttings to cause gas to evolve therefrom, means for treating at least a series of specimens of mud to cause gas to evolve therefrom, two pairs of catalytic filaments for contacting gas to indicate the presence of combustible gas therein, one filament of each pair being operable at a lower voltage adapted to produce the catalytic combustion of hydrocarbon gases except methane and the other filament of each pair being operable at a higher voltage adapted to produce the catalytic combustion of hydrocarbon gases including methane, means for causing the gas evolved from the cuttings to contact one pair of filaments and the gas evolved from the mud to contact the other pair of filaments, a separate electrical Wheatstone bridge circuit for each catalytic filament for determining an effect produced at said filament by catalytic combustion, each circuit including said filament and an electrical meter normally connected across said circuit; the improvement comprising an electrically operated recorder for making a record at least periodically of said effects; a resistance connectable in each said circuit at the position normally occupied by said meter, said resistance having a value greater than the internal resistance of said meter; means for connecting said recorder across a portion of said resistance in the circuit of each filament contacted by gas evolved from the mud, said recorder having means for indicating the result of the effect produced at said lower and higher voltage filaments alternately; and means for connecting said meter without said resistance and said recorder in the circuit of each filament contacted by gas evolved from the cuttings.

6. In apparatus for detecting the presence of combustible gas in specimens returned from apparently successive increments of depth of a well bore during drilling of said bore by a bit while a fluid is circulated into and out of the well bore, including means for treating a series of possible gas containing specimens to cause gas to evolve therefrom and passing said gas in contact with a catalytic filament to determine the presence of combustible gas therein, the improvement comprising an upright chamber separate from said treating means and having a bottom open to the atmosphere and an outlet adjacent the top; means for supplying such evolved gas to said chamber; and means for removing gas from said chamber outlet for passage to said catalytic filament.

7. In apparatus as defined in claim 6, wherein the closed top of said chamber is provided with a centrally disposed inlet and including an outlet adjacent the side wall thereof; a transverse baffle dividing said chamber into upper and lower portions; conduit means extending downwardly from said inlet to said transverse baffle and having ports adjacent the lower end thereof; and an upright baffle surrounding said conduit means in spaced relation thereto and extending between the top of said chamber and said transverse baffle, said transverse baffle having apertures located outwardly from said upright baffle and communicating with the lower portion of said chamber and said upright baffle having apertures therethrough in the upper portion thereof.

8. In apparatus as defined in claim 7, wherein said chamber is cylindrical; said upright baffle is cylindrical; said conduit means comprises a nipple extending downwardly from said inlet and provided with a cap at its lower end having holes in the side thereof and attached to said nipple; and said transverse baffle is supported from said cap.

9. In apparatus as defined in claim 6, wherein said chamber comprises an upright cylinder having an open bottom and a cap closing the top of said cylinder, said cap having an inlet, an outlet and a baffle therebetween so that gas fed into said chamber through said inlet impinges against said baffle to be forced downwardly in said cylinder.

10. In apparatus for detecting the presence of combustible gas in specimens returned from apparently successive increments of depth of a well bore during drilling of said bore by a bit while a fluid is circulated into and out of the well bore, including means for treating a series of possible gas containing specimens to cause gas to evolve therefrom and passing said gas in contact with a catalytic filament to determine the presence of combustible gas therein, the improvement comprising an upright chamber separate from said treating means and having a bottom open to the atmosphere; means for supplying such evolved gas to said chamber at a pressure greater than atmospheric, whereby the pressure of gas within said chamber is reduced to substantially atmospheric; and means for removing gas from said chamber outlet and aspirating air therein to supply an air gas mixture to said catalytic filament.

11. Apparatus as defined in claim 10, wherein said means for treating said specimens to evolve gas therefrom is located at a point remote from said filament and said chamber is disposed near said filament; and including a conduit and pumping means for causing said evolved gas to travel at a relatively fast rate from said specimen treating means to said chamber.

12. In apparatus as defined in claim 10, wherein said means for aspirating air into said gas comprises a valve having an air intake orifice.

13. In apparatus for detecting the presence of combustible gas in specimens returned from apparently successive increments of depths of a well bore, during drilling of said bore by a bit while a fluid is circulated into and out of the well bore, including means for treating a series of possible gas containing specimens to cause gas to evolve therefrom, a catalytic filament contacting said gas to indicate the presence of combustible gas therein, means for causing said gas to contact said filament, and an electrical Wheatstone bridge circuit including said filament in one leg thereof, the improvement comprising an electrically operated recorder for making a record at least periodically of an effect produced at said filament by catalytic combustion; a resistance connected across said Wheatstone bridge circuit; and means for connecting said recorder across a portion only of said resistance.

14. In apparatus as defined in claim 13, including an electrical power supply for said recorder; said recorder having movable indicating means and means responsive to the voltage drop across the recorder connection at said resistance, for moving said indicator to a position corresponding to said voltage drop, said responsive means being supplied with electricity for moving said indicating means by said recorder power supply.

References Cited in the file of this patent

UNITED STATES PATENTS

| | | |
|---|---|---|
| 2,229,884 | Chalkley | Jan. 28, 1941 |
| 2,302,036 | Keeler | Nov. 17, 1942 |
| 2,370,817 | Shanley | Mar. 6, 1945 |
| 2,514,690 | Bliss et al. | July 11, 1950 |
| 2,591,737 | Souther | Apr. 8, 1952 |
| 2,713,010 | Bonner | July 12, 1955 |
| 2,748,884 | Erwin | June 5, 1956 |
| 2,852,091 | Boudreaux et al. | Sept. 15, 1958 |
| 2,857,251 | Krogh | Oct. 21, 1958 |